Figure 1:
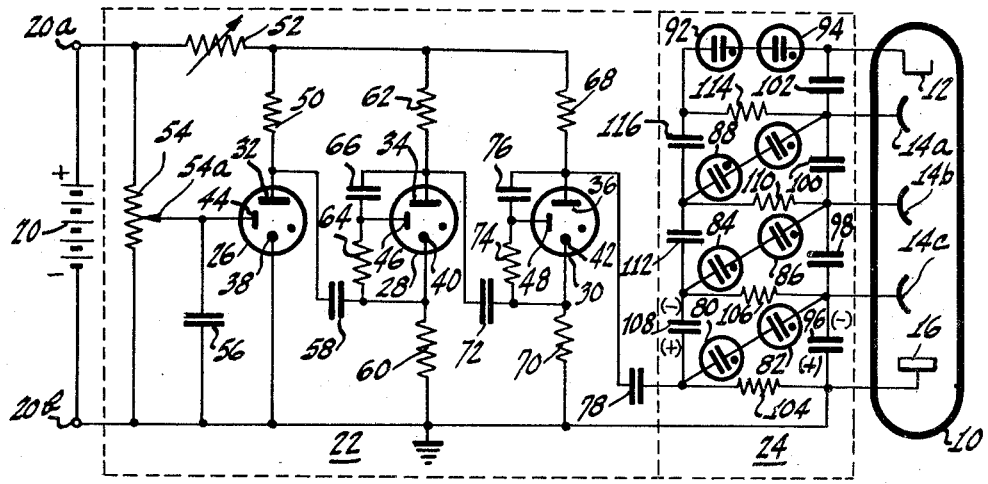

July 21, 1953  K. W. ROBINSON  2,646,542

HIGH-VOLTAGE SYSTEM

Filed March 22, 1951

INVENTOR
KENNETH W. ROBINSON
BY Morris Rabkin
ATTORNEY

Patented July 21, 1953

2,646,542

UNITED STATES PATENT OFFICE 2,646,542

HIGH-VOLTAGE SYSTEM

Kenneth Walter Robinson, Princeton, N. J., assignor to Radio Corporation of America, a corporation of Delaware Application March 22, 1951, Serial No. 216,905

17 Claims. (Cl. 321—2)

This invention relates to improvements in high-voltage low-current power supply systems and, while not limited thereto, finds particular application in portable electrical apparatus requiring high, unidirectional operating voltages.

Many different types of electrical devices presently in use require a high-voltage low-current power source. Typical examples of such devices are cathode ray tubes, electrostatic dust precipitators, electron multiplier phototubes or "photomultipliers," Gieger-Müller radiation detectors and the like.

Since the voltages available from conventional voltage sources such as batteries, commercial supply lines and the like usually are much lower than is required for a device of the type mentioned above, it is necessary to have some arrangement for stepping up these low source voltages by a factor sufficient to provide an output voltage of the order of one or more kilovolts. It is a general object of the present invention to provide an improved circuit for deriving a high, unidirectional output voltage from a low voltage source in a simple and efficient manner.

There are many instances in which high voltage devices of the type previously mentioned are embodied in portable electrical apparatus, such as in nuclear radiation detectors and the like. In such cases, the size and weight of the power supply system is a matter of considerable importance. If batteries are used as the primary energy source, the high voltage power supply system should be capable of operating from lightweight, low voltage batteries. This means that considerable voltage multiplication must be provided by the high voltage supply circuit, and that the power drain on the batteries should be kept as low as possible to insure relatively long useful life for a light-weight, low capacity battery.

It is another object of the invention to provide a high voltage power supply system embodying high efficiency voltage multiplying networks and wherein power consumption is kept at a minimum.

A further object of the invention is to provide an improved voltage pulse generator and amplifier circuit.

Another object of the invention is to provide an improved voltage pulse rectifier-multiplier network.

An additional object of the invention is to provide an improved, self-regulating, high voltage supply circuit.

In accordance with one feature of the invention, a voltage pulse rectifying and multiplying network is provided wherein the rectifier elements comprise bilaterally conductive two electrode gas tubes (i. e. so-called "glow" tubes). The use of these bilaterally conductive tubes as rectifying elements is made possible by supplying unsymmetrical voltage pulses to a network having a ladder-like configuration, the side members of which comprise serially connected capacitors and the lateral members of which comprise resistors, and wherein the glow tubes are connected diagonally between the opposite ends of adjacent ones of the lateral members.

In accordance with a further feature of the invention, a pulse generator and amplifier circuit is provided wherein a low, unidirectional voltage is converted to unsymmetrical voltage pulses of amplitude several times that of the low source voltage. This pulse circuit preferably comprises cold-cathode gas tubes requiring no thermionic heater power. The low voltage source is connected to apply voltage between the anodes and cathodes of a plurality of such tubes which are connected together in cascade so that a voltage pulse generated by breakdown or firing of any one of the tubes is made available as additional anode-cathode voltage for the following tube. In this way, a voltage pulse passed through the network will be amplified an amount determined by the number of tubes used. The amplified pulses then are converted to high, unidirectional voltage in the rectifier-multiplier network.

In accordance with another feature of the invention, regulation of the output voltage, as well as power conservation, is attained by controlling the rate of pulse generation as a function of the output voltage of the system.

Figure 2:
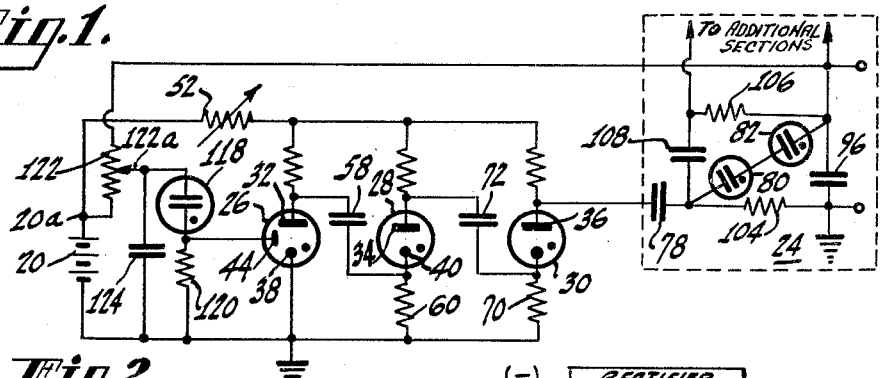
Figure 3:
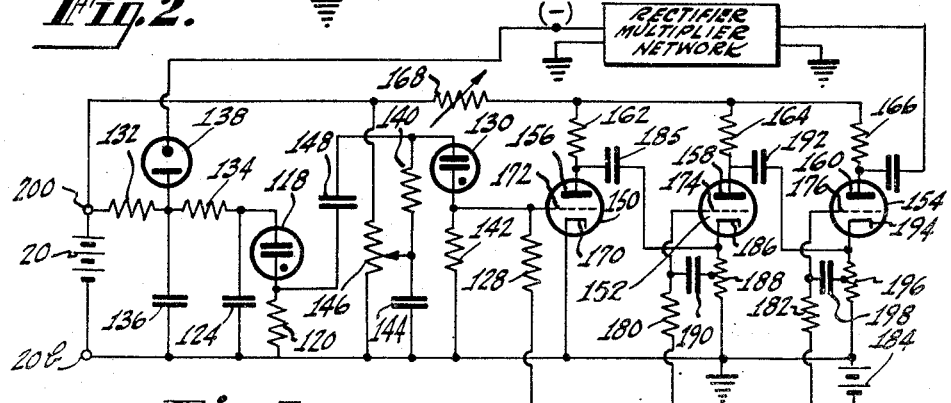

A more complete understanding of the invention can be had by reference to the following description of illustrative embodiments thereof, when considered in connection with the accompanying drawing, wherein:

Fig. 1 is a schematic diagram of a high voltage power supply system embodying the principles of the invention, Fig. 2 is a diagram showing a modification of the system of Fig. 1, including output voltage regulation means, and Fig. 3 is a further modification of the system of Fig. 1, showing an alternative arrangement for regulating the system output voltage in accordance with the invention and also illustrating a vacuum tube pulse amplifier, all embodying principles of the invention.

For the sake of concreteness, and to illustrate a particularly advantageous application of the principles of the invention, there has been selected for illustration in Fig. 1 a circuit for supplying energizing voltages to a photomultiplier electron tube 10 in accordance with the invention. As is well known, photomultiplier tubes comprise a cathode 12, a plurality of secondary emitter or dynode electrodes 14a, 14b, 14c, and a collector or anode electrode 16. The usual photomultiplier tube has about nine dynode or multiplier stages, but only three have been shown in Fig. 1 to simplify the drawing. A voltage of the order of 100 volts is required between each pair of adjacent electrodes, making a total of about 1000 volts required for the conventional multiplier.

In accordance with the present invention, operating voltage for the photomultiplier 10 is derived from a battery or similar low voltage source 20. The battery voltage, which may be of the order of 180 volts, is stepped up in the circuit presently to be described, to provide the required photomultiplier electrode voltages.

The voltage step-up circuit shown in Fig. 1 comprises two sections; a pulse generator and amplifier 22, and a pulse rectifying and voltage multiplying network 24.

The pulse generator and amplifier 22 comprises three cold-cathode gas tubes 26, 28 and 30, having anodes 32, 34 and 36, cathodes 38, 40 and 42, and so-called "starter" anodes 44, 46 and 48, respectively. In the embodiment of the invention shown in Fig. 1, the first tube 32 is connected to the voltage source 20 to operate as a pulse generator, while the remaining tubes 28, 30 are connected to amplify pulses generated by the first tube 20.

As is well known, a cold-cathode gas tube, such as a commercial type 5823 gas tube, for example, will not conduct current until a voltage equal to the so-called "breakdown" voltage is applied between the anode and cathode thereof. This breakdown voltage can be reduced by adding an additional electrode (i. e. a "starter" anode) to the tube, as in the type 5823 tube, and applying a large enough voltage between the starter and cathode electrodes. The required starter anode voltage usually is somewhat lower than the main anode breakdown voltage. For example, in the type 5823 tube, breakdown will occur with a main anode-to-cathode voltage of 280 volts, or with a main anode-to-cathode voltage of 180 volts and a starter anode-to-cathode voltage of 80 volts. Once the tube breaks down, it will conduct current with a voltage drop of approximately 70 volts between the main anode and cathode, and will continue to conduct current until the main anode-to-cathode voltage decreases to the so-called extinction voltage. In the case of the 5823 tube, this extinction voltage is approximately 70 volts.

The first tube 26 in the pulse network 22 has its anode 32 connected through a fixed resistor 50 and a variable resistor 52 to the positive terminal 20a of the battery 20, and its cathode 38 connected to the negative terminal 20b of the battery 20. To operate the tube 26 as a pulse generator, a potentiometer 54 is connected between the battery terminals 20a, 20b, and the potentiometer tap 54a is connected to the starter anode 44. A capacitor 56 is connected between the starter 44 and the cathode 38 of the tube 26.

Assuming that the tube 26 is a type 5823 tube, and that the output voltage of the battery 20 is 180 volts, the tube 26 will not conduct current unless the starter anode voltage is at least 80 volts. When circuit operation begins, the capacitor 56 will begin to charge through the potentiometer 54. This will result in a gradual voltage increase at the starter anode 44 until the voltage at the starter anode becomes high enough to cause breakdown in the tube 26. When the tube 26 breaks down, the voltage at the anode 32 thereof will drop abruptly from 180 volts to approximately 70 volts, and the capacitor 56 simultaneously will discharge through the space between the cathode 38 and the starter anode 44. This will decrease the starter anode voltage so that the voltage across the tube 26 will be below the extinction voltage, and conduction through the tube 26 will stop. Thereupon, the voltage at the anode 32 will jump back up to 180 volts. The tube 26 then will be quiescent until the starter anode voltage again has increased enough to allow the tube 26 to break down.

Thus, it can be seen that the voltage wave at the anode 32 of the tube 26 will comprise a train of negative-going pulses, of amplitude determined by the voltage of the battery 20 and the voltage drop across the resistors 50, 52, and of repetition rate determined by the setting of the potentiometer tap 54a and the capacitance of the capacitor 56. Since there is negligible resistance in the starter anode-cathode circuit, the pulse duration will be mainly determined by the capacity of the capacitor 56, and will be relatively short compared to the intervals between pulses.

The negative going pulses at the anode 32 of the tube 26 will be applied through a capacitor 58 to the cathode 40 of the second gas tube 28. The cathode 40 of the second tube 28 is connected through a resistor 60 to the negative terminal 20b of the battery 20, while the anode 34 thereof is connected through a resistor 62 and the resistor 52 to the positive battery terminal 20a. An isolating resistor 64 is connected between the second tube starter anode 46 and the cathode 40 thereof, and a capacitor 66 is connected between the starter anode 46 and the main anode 34.

Prior to the arrival of a negative pulse at the second tube cathode 40, the main anode-to-cathode voltage of the tube 40 will be less than the breakdown voltage. However, when a negative pulse arrives, the cathode voltage will drop by an amount equal to the pulse amplitude, causing the tube 28 to break down. At this time, the available main anode-to-cathode voltage of the second tube 28 will be the battery voltage plus the amplitude of the pulse applied to the second tube cathode 40. Therefore, there will be developed at the second tube anode 34 a negative-going pulse of approximately twice the amplitude of the pulse developed at the first tube anode 32.

The coupling capacitor 66 between the second tube main anode 34 and starter anode 46 will assist in causing breakdown of the second tube 28, since the starter anode voltage will be held at a value slightly below that of the anode 34. That is, when the pulse from the first tube 26 arrives at the second tube cathode 40, the voltage at the starter anode 46 will be held relatively constant, causing an effective increase in the starter anode-to-cathode voltage. It will be understood, however, that the starter anode is not essential in the second tube 28 as the amplitude of the pulse applied to the cathode 40 thereof can well be large enough to cause the tube to break down.

The third tube 30 in the pulse network 22 is connected to the voltage source 20 through a pair of resistors, 68 and 70, in the same manner as the preceding tube 28. A coupling capacitor 72 connects the third tube cathode 42 to the second tube anode 34, and an isolating resistor 74 and capacitor 76 make the connections for the third tube 30 identical to those for the second tube 28. Therefore, the third tube 30 will operate to amplify the pulse applied to the cathode 42 thereof in exactly the same manner as has already been described in connection with the second tube 28, providing at the third tube anode 36 a negative-going pulse of approximately three times the amplitude of the pulse generated by the first tube 26. The pulse amplitude can be adjusted as desired by varying the resistor 52.

From the foregoing, it will be seen that the network 22 provides a simple and efficient circuit for obtaining an unsymmetrical pulse wave of peak-to-peak amplitude potentially many times the value of the source voltage. Of course, a considerably greater number of stages could be used in any case where pulses of greater amplitude are required.

As will be pointed out more fully hereinafter, the pulse amplifying principle illustrated by the network 22 is not limited to the case of cold-cathode gas tubes, although for a portable power supply of the type presently being considered, the low power consumption of such tubes is a material consideration in their favor.

The pulses from the network 22 will be applied through a coupling capacitor 78 to the rectifier-multiplier network 24. In accordance with the invention, this network 24 has a ladder-like configuration and utilizes as rectifying elements so-called glow tubes 80—94, such as commercial type NE-2 neon tubes.

The glow tubes 80—94 comprise two-electrode gas filled tubes having characteristics somewhat similar to the tubes 26—30 in the network 22, with the exception that the tubes 80—94 have two electrodes of equal area rather than dissimilar anodes and cathodes. The tubes 80—94 are bilaterally conductive, but have a predetermined breakdown voltage which must be applied between the electrodes thereof before the tubes will conduct. Glow tubes of this type are preferable to thermionic rectifiers in a system of the type being described since they require no cathode heating power. They are also preferable to such rectifying elements as crystals, copper oxide rectifiers and the like, since they have much higher impedance prior to breakdown than the so-called "back resistance" of other cold-cathode rectifier elements of the type mentioned. However, since the glow tubes are bilaterally conductive, they cannot be used conveniently in a conventional voltage doubler circuit, since such circuits ordinarily are designed to operate with alternating input voltages which effectively reverse in polarity each half cycle. Therefore, in such circuits, it is customary to use substantially unilaterally conductive rectifying elements, as otherwise no rectifying action could be obtained.

In the network 24, the desired operating voltage for the photomultiplier 10 is developed in steps across a plurality of storage capacitors 96—102. These capacitors 96—102 are connected in series, one between each adjacent pair of photomultipler electrodes, to form one of the "side members" of the ladder. A first pair (80, 82) of the glow tubes connects the coupling capacitor 78 in series with the first storage capacitor 96.

It will be assumed that the network 22 is adjusted to provide pulses of about 200 volts amplitude, and that the glow tubes 80, 82 each have a breakdown voltage of the order 70 volts. When a 200 volt negative pulse is supplied by the pulse network 22, the tubes 80, 82 will break down, allowing current to flow which will charge the capacitor 96 with polarity as indicated.

Assuming that the conduction voltage of the tubes 80, 82, after breakdown, is of the order of 50 volts, approximately 100 volts will be available from the 200 volt pulse to charge the storage capacitor 96. Actually, the 200 volt negative pulses from the network 22 will divide between the coupling capacitor 78, the tubes 80, 82 and the storage capacitor 96. However, if the coupling capacitor 78 is substantially larger than the storage capacitor 96, most of the 200 volts not appearing across the glow tubes 80, 82 will appear across the smaller capacitor 96.

At the end of each negative pulse, the voltage at the anode 36 of the last amplifier gas tube 30 will rise abruptly, and if the voltage across the coupling capacitor 78 has not changed appreciably during the pulse, the glow tubes 80, 82 will extinguish, leaving about 100 volts on the storage capacitor 96. This, of course, will not be enough to break down the glow tubes 80, 82 in the opposite direction so as to discharge the storage capacitor 96.

The intervals between the negative pulses should be long enough to allow the coupling capacitor 78 to regain any charge that it loses during the negative pulses. Otherwise, the coupling capacitor voltage eventually may change enough to cause inverse breakdown of the glow tubes at the end of the negative pulses. In other words, a "low duty cycle" pulse wave is required to drive the rectifier-multiplier network, the term "low duty cycle" being used to indicate that the pulse duration is appreciably shorter than the interval between pulses.

In order to charge the second storage capacitor 98, there is provided a second coupling capacitor 108, across which there will be developed a voltage which can be added to the pulse input voltage so as to operate the second section of the network 24 at a higher voltage level than the first section. To this end, the second coupling capacitor 108 is connected in a closed loop with the first storage capacitor 96 by a pair of resistors 104, 106.

After the pulse from the network 22 has ended, some charge can be transferred from the capacitor 96 to the capacitor 108 through the resistors 104, 106. If the capacitance of the two capacitors 96, 108 is the same, then the two capacitors 96, 108 eventually will acquire equal voltages; in the specific example given, voltages of the order of 100 volts and of polarity is indicated.

A second pair of glow tubes 84, 86 are connected in series between the second coupling capacitor 108 and the second storage capacitor 98. With approximately equal voltages on the second coupling capacitor 108 and on the first storage capacitor 96, it can be seen that the second pair of glow tubes 84, 86 and the second storage capacitor 98 will receive input pulses in substantially the same manner as the first pair of glow tubes 80, 82 and the first storage capacitor 96. Of course, due to the voltages on the second coupling capacitor 108 and the first storage capacitor 96, the second section of the network 24 will operate at a more negative voltage level than the first section. Therefore, the voltage on the second storage capacitor 98 effectively will be added to that on the first storage capacitor 96.

Additional coupling capacitors 112, 116, transfer resistors 110, 114, and glow tubes 88—94 are connected in similar fashion to provide charging and transfer circuits for the third and fourth storage capacitors 100, 102. In terms of the "ladder" analogy previously suggested, the serially connected coupling capacitors 108, 112, 116 comprise the second side member of the ladder, and the resistors 104, 106, 110, 114 comprise the lateral or "rung" members of the ladder. The glow tubes 80—94 diagonally connect adjacent pairs of the lateral members 104, 106, 110, 114.

It can be seen that a voltage of approximately 100 volts will be made available for each stage of the photomultiplier; a total of 400 volts in the specific example given. The possibility of extending the multiplying principle to provide voltages of much greater magnitude will be readily apparent. The number of sections required, and the number of glow tubes per section, will be dictated by the output voltage or voltages required and the break-down voltage of the glow tubes used.

In actual operation, the rectifier-multiplier network 24 may not operate in the precise sequence of steps that has just been explained, since the higher order sections of the network probably will begin to conduct current before the first is fully charged. It is thought, however, that the foregoing explanation will serve to provide an understanding of the function of the various elements, and of the basic principles of the network operation.

While the circuits just described ordinarily will function in very satisfactory fashion, it has been found that glow tubes of the type used in the network 24 do not always break down immediately when operated in total darkness, as in a light tight housing. This appears to be due to a deficiency of ions to initiate the discharge. This effect may cause fluctuations in the output voltage, as well as low current output. One expedient that has been effective in overcoming this difficulty is to coat the glow tubes with a phosphorescent material which is excited by the glow of the tubes and has a long enough decay time to maintain ions sufficient to initiate the next discharge. An alternative arrangement for overcoming this difficulty will be explained in connection with the circuit of Fig. 2, wherein there is illustrated a further embodiment of the invention including means for keeping the current drain on the low voltage source at a minimum value as well as for regulating the output voltage of the system.

In the circuit of Fig. 2, the basic pulse source comprises a glow tube relaxation oscillator. This oscillator includes a glow tube 118 connected across the battery 20 in series with a resistor 120, and one section of a potentiometer 122. A capacitor 124 is connected in parallel with the series combination of the glow tube 118 and the resistor 120.

Disregarding, for the moment, the complete circuit for the potentiometer 122, it can be seen that the capacitor 124 will charge through the lower section of the potentiometer 122. When the voltage across the capacitor 124 becomes large enough to cause breakdown of the tube 118, a current pulse will flow therethrough to develop a voltage pulse across the resistor 120.

The firing anode 44 in a first cold-cathode gas tube 26 is connected to receive the voltage pulse generated by break-down of the glow tube 118. This will cause breakdown of the first gas tube 26, whereupon the remaining gas tubes 28, 30 will function to provide an amplified output pulse in the same manner as has already been described in connection with the circuit of Fig. 1. The output pulses from the pulse network 22 will be rectified in the network 24 in a manner similar to that described in connection with Fig. 1. For simplicity, only one section of the network 24 is shown in Fig. 2.

To insure uniform breakdown of the glow tubes 80—94 in the network 24, these glow tubes can be grouped about the glow tube 118 in the relaxation oscillator circuit. This arrangement makes use of the light pulse created when the glow tube 118 breaks down, to insure proper ionization of the gas in the multiplier network glow tubes. Since the pulse generator glow tube 118 is not "pulse triggered," it is not essential that this tube respond instantly to a firing voltage as must the tubes in the network 24.

In order to provide regulation of the system output voltage, and to reduce power consumption as much as possible, the potentiometer 122 is connected between the positive terminal 20a of the battery 20 and any suitable negative voltage point in the rectifier-multiplier network 24. Thus, the amplitude of the voltage across the potentiometer 122 will be determined by the amplitude of the system output voltage. The potentiometer tap 122a is adjusted to a point such that the tube 118 will break down only very infrequently as long as there is no load on the system. When current is drawn from the system, causing a decrease in the output voltage thereof, the voltage at the potentiometer tap 122a will become more positive, causing the capacitor 124 to charge more rapidly between pulses and thereby increasing the pulse repetition rate of the system. In turn, this will mean that output pulses will be applied more frequently to the rectifier-multiplier 24 to take up the increased load. On the other hand, it can be seen that as long as no current is being drawn from the system, the glow tube 118 will only break down at a very slow rate, thereby drawing very little current from the battery 20. Thus, the circuit shown in Fig. 2 will provide both regulation of output voltage and economy of power consumption.

While the simple form of "regulated repetition rate" pulse generator shown in Fig. 2 will operate satisfactorily for many purposes, the circuit involves a compromise which imposes some limitations on flexibility.

It can be seen that the potentiometer 122 and the battery 20 are effectively in shunt with the negative high voltage output (e. g., in Fig. 2, the capacitor 96). Therefore, a relatively high resistance potentiometer 122 is required so that there will be a minimum drain on the high voltage supply. On the other hand, if the resistance of the potentiometer 122 is very large, it is difficult to develop a pulse of satisfactory amplitude and repetition rate across the resistor 120. Consequently, a compromise must be accepted between drain on the negative voltage source and output pulse amplitude and repetition rate.

This difficulty can be avoided with the circuit arrangement shown in Fig. 3. The power supply of Fig. 3 also includes a vacuum tube pulse amplifier, as well as a somewhat more efficient regulating arrangement, all embodying the principles of the invention.

In the system shown in Fig. 3, the pulse generator comprises a two-tube relaxation oscillator, including a first glow tube 118 and a second glow tube 130. The first tube 118 is connected in series with three resistors 132, 134, 120 across the battery 20. A first capacitor 136 is connected in shunt with the first resistor 132 and the battery 20. A second capacitor 124 is connected in shunt with the resistor 134 and the capacitor 136. This places the first glow tube 118 and the third resistor 120 in series across the capacitor 124.

It can be seen that the tube 118, the capacitor 124, and the resistors 120, 134 form a relaxation oscillator circuit similar to that shown in Fig. 2. In Fig. 3, the capacitor 136 effectively serves as the "voltage reservoir" for this relaxation oscillator.

The voltage across the reservoir capacitor 136 is made to depend on the output voltage of the rectifier-multiplier network 24 by connecting a so-called "corona" regulator tube 138 (see e. g. U. S. P. 1,558,981—Lewrs) between the junction of the resistors 132, 134 and an output terminal of the rectifier-multiplier network 24. As is well known, a corona regulator tube is adapted to conduct different amounts of current with a high, substantially constant voltage drop thereacross, and for this reason can be used in high voltage apparatus where the more familiar gas regulator tube would be unsuitable. Since the regulator tube 138 is essentially a constant voltage device, it will transfer substantially all of any change in the output voltage of the network 24 to the junction between the resistors 132, 134. Accordingly, the voltage available across the reservoir capacitor 136 will change with changes in the high negative output voltage of the system to regulate the firing of the first glow tube 118 as in the circuit of Fig. 2. However, in the Fig. 3 system, a much more sensitive regulatory action is possible because there will be no attenuation of these output voltage changes.

In order to decrease the loading effect of the relaxation oscillator circuit on the rectifier-multiplier network 24, the resistors 132, 134 and 120 are made quite large, with the result that firing of the first glow tube 118 will provide only a very small or low repetition rate pulse across the resistor 120. This pulse may not have sufficient energy to provide a suitable light pulse for exciting the glow tubes in the multiplier network.

Accordingly, the second glow tube 130 is connected in series with a pair of resistors 140, 142 across a capacitor 144. The capacitor 144 is connected across the lower section of a potentiometer 146 which is in shunt with the battery 20. The potentiometer 146 is adjusted so that, with the capacitor 144 fully charged, the second glow tube 130 will not quite break down. The resistors 140, 146 and the capacitor 144 are made small enough so that the capacitor 144 can recharge very quickly after being discharged.

Pulses developed across the resistor 120 by breakdown of the first glow tube 118 will pass through a capacitor 148 and effectively add momentarily to the voltage across the second glow tube 130. This will cause the second tube 130 to break down, developing a much larger pulse across the resistor 142. These pulses then can be utilized to drive a pulse amplifier network, as will presently be described. The higher energy current pulse through the glow tube 130 will provide adequate light energy to insure uniform excitation of the multiplier network glow tubes.

The pulse amplifier circuit shown in Fig. 3 illustrates the applicability of the principle of pulse amplification disclosed herein to a vacuum tube circuit. In apparatus wherein the heater power required by thermionic vacuum tubes is not objectionable, such tubes can be used to advantage in the manner shown in Fig. 3.

Three vacuum tubes 150, 152, 154 are provided, having anodes 156, 158, 160 connected through separate load resistors 162, 164, 166 and a common variable resistor 168 to the positive terminal 20a of the battery 20.

The cathode 170 of the first tube 150 is connected directly to the negative battery terminal 20b, and the control grid 172 of the same tube 150 is connected to the resistor 142 to receive positive pulses from the pulse generator. The control grids 172, 174, 176 of all three tubes are connected through resistors 178, 180, 182 to a negative bias voltage source, shown as a battery 184, to normally prevent conduction in the tubes 150, 152, 154.

The first tube anode 156 is connected through a coupling capacitor 185 to the second tube cathode 186, which, in turn, is connected to the negative terminal 20b of the main battery 20 through a resistor 188.

When a positive pulse is applied to the first tube control grid 172, the voltage at the first tube anode 156 will drop suddenly, causing the second tube cathode 186 to go negative by substantially the same amount. A coupling capacitor 190 connecting the second tube cathode 186 and control grid 174 effectively will cause a positive grid-to-cathode voltage to be developed when the cathode is driven negative. This will allow the tube 152 to conduct current with an apparent energizing voltage greater than that of the battery 20. When the tube 152 conducts, the voltage at the anode 158 thereof will drop substantially twice as much as the drop at the first tube anode 156.

A coupling capacitor 192 will transmit the negative pulse from the second tube anode 158 to the third tube cathode 194. A cathode resistor 196 and grid-to-cathode coupling capacitor 198 for the third tube 154 will cause the latter to function in a manner substantially identical to that of the second tube 158, to provide at the third tube anode 160 negative pulses of substantially three times the amplitude of those generated at the first tube anode 156.

Thus, it can be seen that the principle of pulse amplification disclosed herein, although especially applicable to cold cathode gas tube circuits, is also applicable to thermionic vacuum tube circuits. From the foregoing, it will also be apparent that the present invention provides a simple and efficient power supply system, and one that is well suited for supplying regulated low-current, high-voltage power to electrical apparatus.

What is claimed is:

1. A power supply system comprising a unidirectional voltage source, a pulse generator connected to said source to convert unidirectional voltage from said source into voltage pulses, a network having a ladder-like configuration, said network including side members each comprising a plurality of serially connected capacitors, lateral members connecting said side members and comprising a plurality of resistors connected one between the junctions of each adjacent pair of capacitors in each said side member and one between the ends of said side members, bilaterally-conductive gas-filled tubes connected diagonally between the opposite ends of each adjacent pair of said resistors, and a circuit connecting said pulse generator to said network to apply pulses from said generator to said network to charge each capacitor in one of said sets to a voltage equal to the difference between the amplitude of the pulses from said source and the conduction voltage of said tubes.

2. A system as defined in claim 1 including a pulse amplifier circuit, connected between said generator and said network, and comprising a plurality of electron tubes each having an anode and a cathode, said electron tubes being connected in cascade with coupling capacitors connecting the anode of each tube to the cathode of a succeeding tube to apply to the cathode of each said succeeding tube voltage changes occuring at the anode of each preceding tube.

3. A system as defined in claim 1 wherein said pulse generator comprises a relaxation oscillator including a bilaterally-conductive gas-filled tube, said diagonally connected gas-filled tubes being grouped about said oscillator tube in light-transfer relation thereto.

4. A system as defined in claim 1 including means connecting said one set of capacitors to said pulse generator to control the rate of generation of said pulses as a function of the voltage across the capacitors in said one set.

5. A system as defined in claim 1 wherein said pulse generator comprises an additional capacitor, an additional resistor, a first circuit for charging said additional capacitor from said low voltage source, a second circuit for periodically discharging said additional capacitor through said additional resistor in response to development of a predetermined voltage across said additional capacitor, and an element in said first circuit, connecting said additional capacitor to said capacitors in said one set, to control the rate of charging said additional capacitor as a function of the voltage across said capacitors in said one set.

6. In a pulse rectifying and voltage multiplying system, a network having a ladder-like configuration, said network including side members comprising two sets of serially connected capacitors, lateral members connecting said side members and comprising resistors connected one between the junctions of each adjacent pair of capacitors in each set and one between the ends of each said capacitor set, and bilaterally-conductive gas-filled tubes connected diagonally between the opposite ends of each adjacent pair of said resistors.

7. In a power supply system, in combination, a first group of serially connected capacitors, a plurality of resistors, a second group of capacitors, a plurality of neon tubes, each said capacitor in said first group having in shunt therewith the series combination of one of said resistors and one of said neon tubes, each said neon tube but one having in shunt therewith the series combination of one of said resistors and one of said second group of capacitors, said one neon tube being connected to the last one of said first group of serially connected capacitors, a voltage pulse source, and a connection from said pulse source to the junction between the resistor and the neon tube shunting the first capacitor in said first group of capacitors.

8. A power supply system as defined in claim 7, wherein said pulse source comprises a relaxation oscillator including a neon tube, said plurality of neon tubes being grouped about said relaxation oscillator neon tube in light-transfer relation thereto.

9. A system as defined in claim 7, including means connecting said capacitors in said first group to said pulse source to regulate the pulse repetition rate of said pulse source as a function of the voltage across said first group of capacitors.

10. A voltage pulse amplifier comprising a plurality of electron tubes each having an anode and a cathode, a unidirectional voltage source having a pair of terminals, resistors separately connecting each said anode to one of said terminals, resistors separately connecting the cathode in each but one of said tubes to the other of said terminals, a connection from said one tube cathode to said other terminal, capacitors separately connecting the cathode in each but said one tube to the anode in another of said tubes, and means connected to said one tube to cause current pulses to flow through said one tube.

11. An electrical pulse generator and amplifier comprising a cold cathode gas tube, a plurality of elements within said gas tube including a starter anode, a capacitor connected between said anode and another of said tube elements, an impedance, a voltage source, means including said voltage source for charging said capacitor through said impedance to a voltage sufficient to establish current flow between said anode and said another tube element thereby to discharge said condenser, a second impedance, a circuit including said second impedance connecting said voltage source between two of said tube elements to establish current flow through said circuit in response to current flow between said anode and said another tube element, a second cold cathode gas tube, at least two elements within said second gas tube, a second circuit connecting said voltage source between said second tube elements, and connections between said first and second circuits to add to the voltage applied from said source between said second tube elements the voltage developed by current flow through said second impedance.

12. In an electrical circuit comprising a voltage source and first and second electron tubes each having at least two electrodes connected to opposite terminals of said voltage source through impedance elements, the improvement which comprises a connection between one of said first tube electrodes and one of said second tube electrodes to add to the voltage applied between said second tube electrodes substantially all of the voltage change produced at said one first tube electrode by a change in the current flow between said first tube electrodes.

13. In a system for operating an electron tube from a unidirectional voltage source at a voltage higher than the voltage of said source, in combination, an electron tube having a pair of electrodes, a first impedance, a circuit including said impedance connecting said voltage source between said electrodes, a second electron tube having a pair of electrodes, a second impedance, a second circuit including said second impedance connecting said voltage source between said second tube electrodes, means connecting the junction of said first impedance and one of said first tube electrodes to the junction of said second impedance and one of said second tube electrodes to apply between said second tube electrodes voltage changes occurring at said one first tube electrode, and means connected to said first circuit to abruptly alter the current in said first circuit.

14. In a system for deriving, from a voltage source, voltage pulses of amplitude greater than the amplitude of the voltage furnished by said source, in combination, an electron tube having at least two electrodes, an impedance, a circuit including said impedance connecting said voltage source between said two electrodes, pulse generating means to derive from said voltage source voltage pulses of amplitude less than the amplitude of the voltage furnished by said source, and a connection from said pulse generating means to the junction between said impedance and one of said electrodes to apply said pulses from said pulse generating means to said one electrode.

15. An electron tube circuit comprising a voltage source, an electron tube having a pair of electrodes, an impedance, a circuit connecting said voltage source between said two electrodes, said impedance being connected in said circuit between said voltage source and one of said electrodes, a second impedance, a second circuit connecting said second impedance across said voltage source to pass current from said source through said second impedance, means in said second circuit for abruptly altering the current through said second impedance to cause a change in the voltage developed by said current flow through said second impedance, and a connection from said second impedance to said one electrode to apply to said one electrode the voltage change caused by said abrupt current change.

16. In a power supply system, in combination, a unidirectional voltage source, a pulse generator circuit connected to said source to generate voltage pulses, a first capacitor, a first circuit connecting said capacitor to said pulse generator, said first circuit including means to convert pulses from said generator into unidirectional voltage across said first capacitor, and a second circuit connecting said first capacitor to said pulse generator, said second circuit including means responsive to the unidirectional voltage across said first capacitor to control the rate of generation of pulses in said pulse generator.

17. A power supply system as defined in claim 16, wherein said pulse generator comprises a relaxation oscillator including a second capacitor and a third circuit connecting said second capacitor to said voltage source to charge said second capacitor at a predetermined rate, and wherein said means in said second circuit comprises elements connecting said second and said third circuits to control said charging rate as a function of the unidirectional voltage across said first capacitor.

KENNETH WALTER ROBINSON.

References Cited in the file of this patent

UNITED STATES PATENTS

| Number | Name | Date |
|---|---|---|
| 1,734,917 | Peek | Nov. 5, 1929 |
| 2,360,857 | Eldredge | Oct. 24, 1944 |
| 2,499,484 | Friend | Mar. 7, 1950 |

OTHER REFERENCES

Bell Telephone System Technical Publication Monograph B-1166 by S. B. Ingram, July 1939, page 9.